United States Patent
Lin

(10) Patent No.: US 8,614,953 B2
(45) Date of Patent: Dec. 24, 2013

(54) METHOD FOR MONITORING AND REPORTING EVENTS BY MEDIA GATEWAYS

(75) Inventor: Yangbo Lin, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 230 days.

(21) Appl. No.: 13/278,362

(22) Filed: Oct. 21, 2011

(65) Prior Publication Data

US 2012/0057470 A1 Mar. 8, 2012

Related U.S. Application Data

(63) Continuation of application No. 11/404,558, filed on Apr. 14, 2006, now Pat. No. 8,134,926.

(30) Foreign Application Priority Data

Apr. 15, 2005 (CN) .......................... 2005 1 0064589

(51) Int. Cl.
   *H04J 3/14* (2006.01)
(52) U.S. Cl.
   USPC .......................................... 370/241; 709/224
(58) Field of Classification Search
   None
   See application file for complete search history.

(56) References Cited

U.S. PATENT DOCUMENTS

| | | |
|---|---|---|
| 6,693,897 B1 | 2/2004 | Huang |
| 6,879,820 B2 | 4/2005 | Bjelland et al. |
| 6,888,839 B1 | 5/2005 | Scoggins et al. |
| 7,117,241 B2 | 10/2006 | Bloch et al. |
| 7,133,912 B1 | 11/2006 | Gary |
| 7,336,603 B2 | 2/2008 | Sugiyama et al. |
| 7,406,696 B2 | 7/2008 | Burger et al. |
| 7,415,007 B2 | 8/2008 | Huang |
| 7,564,835 B1 | 7/2009 | Grabelsky et al. |
| 2002/0027983 A1 | 3/2002 | Suzuki |
| 2002/0165961 A1 | 11/2002 | Everdell et al. |

(Continued)

FOREIGN PATENT DOCUMENTS

| | | |
|---|---|---|
| CA | 2384989 A1 | 3/2001 |
| CA | 2 550 291 | 3/2006 |

(Continued)

OTHER PUBLICATIONS

Auon, C. et al.; Nortel Networks; "A NAT package for MGCP NAT traversal, draft-auon-mgcp-nat-package-oo.text"; Internet Draft; Category: Informational; Jun. 2002 (7 pgs.).

(Continued)

*Primary Examiner* — Kevin C Harper
(74) *Attorney, Agent, or Firm* — Conley Rose, P.C.; Grant Rodolph; Nicholas K. Beaulieu

(57) ABSTRACT

A method for monitoring and reporting events by media gateways, including: presetting events in the media gateways; the media gateways monitoring the preset events and reporting the monitoring result to a media gateway controller during operation. The events may include: off-hook, on-hook, dialing, hook flash, network fault, quality alarm, and timer timeout, etc. By presetting events in the media gateways, the problem of system resulted from the fact that the media gateways can not obtain events issued from the media gateway controller due to various reasons can be avoided through presetting events in the media gateway and then monitoring and reporting the events by the media gateway automatically after the media gateways are started up. Thereby, system stability can be improved.

17 Claims, 2 Drawing Sheets

(56) References Cited

U.S. PATENT DOCUMENTS

| | | | |
|---|---|---|---|
| 2002/0188713 | A1 | 12/2002 | Bloch et al. |
| 2003/0126615 | A1 | 7/2003 | Fukada |
| 2004/0042485 | A1 | 3/2004 | Gettala et al. |
| 2004/0165531 | A1 | 8/2004 | Brady |
| 2004/0218585 | A1 | 11/2004 | Huang |
| 2005/0276386 | A1* | 12/2005 | Ethier et al. ............... 379/32.05 |
| 2007/0110043 | A1 | 5/2007 | Girard |

FOREIGN PATENT DOCUMENTS

| | | |
|---|---|---|
| CN | 1411225 | 4/2003 |
| CN | 1452347 | 10/2003 |
| CN | 1452347 A | 10/2003 |
| CN | 1533113 A | 9/2004 |
| CN | 1567905 A | 1/2005 |
| EP | 1744488 A1 | 1/2007 |
| JP | 03-186958 | 8/1991 |
| JP | 09-282252 | 10/1997 |
| JP | 2002-325101 | 11/2002 |
| JP | 2004-282556 | 10/2004 |
| WO | WO-2004/089003 A1 | 10/2004 |
| WO | WO 2005/018248 | 2/2005 |

OTHER PUBLICATIONS

Zhengguang, W., et al.; Comparison between the Existing two Media Gateway Control Protocols for Next Generation Network; National Laboratory of Switching Technology and Telecommunications, Beijing, 2004 (pp. 20-23).

Office Action corresponding to U.S. Appl. No. 11/404,558, dated Nov. 21, 2008.

Office Action corresponding to U.S. Appl. No. 11/404,558, dated May 28, 2009.

Office Action corresponding to U.S. Appl. No. 11/404,558, dated Jul. 30, 2009.

Office Action corresponding to U.S. Appl. No. 11/404,558, dated Jan. 28, 2010.

Office Action corresponding to U.S. Appl. No. 11/404,558, dated Aug. 25, 2010.

Office Action corresponding to U.S. Appl. No. 11/404,558, dated Jan. 4, 2011.

Office Action corresponding to U.S. Appl. No. 11/404,558, dated Mar. 30, 2011.

Office Action corresponding to U.S. Appl. No. 11/404,558, dated Sep. 15, 2011.

Canadian Office Action dated (mailed) Oct. 18, 2011, issued in related Chinese Application No. 2 542 088 Huawei Technologies C., Ltd (5 pages).

Foreign Communication From A Counterpart Application, Canadian Application 2542088, Office Action dated Nov. 14, 2012, 7 pages.

Foreign Communication From A Counterpart Application, Canadian Application 2542088, Office Action dated Oct. 18, 2011, 5 pages.

Summons to attend oral proceedings pursuant to Rule 115(1) EPC dated (mailed) Nov. 11, 2010, issued in related Application No. 06111554.9-2413/1713229, filed Mar. 22, 2006, Huawei Technologies Co., Ltd.

English Translation of the PCT Written Opinion of the International Searching Authority for International Application No. PCT/CN2006/000556, mailed Jul. 20, 2006, 5 pgs.

European Patent Office Communication in Application 06111554.9 pursuant to Article 96(2) dated Apr. 10, 2007, 5 pgs.

European Patent Office Communication in Application 06111554.9 of a Notice of Opposition dated Nov. 27, 2009, 28 pgs.

First Office Action from the Chinese Patent Office for Application No. 2005100645892, dated Dec. 22, 2006, 4 pgs., English Translation Attached.

Australia Office Action, dated May 7, 2008, 2 pgs.

Canada Office Action, dated Dec. 8, 2009, 5 pgs.

International Telecommunication Union; ITU-T ; H.248.1; Telecommunication Standardization Sector of ITU; Series H: Audiovisual and Multimedia Systems"Gateway Control Protocol, Version 2", May 2002, 148 pgs.

International Telecommunication Union; ITU-T ; H. 248.1 v.2; Telecommunication Standardization Sector of ITU; Series H: Audiovisual and Multimedia Systems, "Gateway Control Protocol, Version 2; Corrigendum 1", Mar. 2004, 41 pgs.

International Telecommunication Union; ITU-T; H.248.14; Telecommunication Standardization Sector of ITU; Series H: Audiovisual and Multimedia Systems, "Gateway Control Protocol: Inactivity Timer Package", Mar. 2002, 8 pgs.

Canadian Office Action dated Oct. 6, 2010, issued in co-pending related Canadian application No. 2 542 088, Huawei Technologies Co. Ltd.

Korean Office Action dated (mailed) Sep. 27, 2007, issued in co-pending related Korean application No. 10-2006-0033958, Huawei Technologies Co. Ltd.

Australian Examiner's First Report dated Apr. 4, 2007, issued in co-pending related Australian application No. 2006201331, Huawei Technologies Co. Ltd.

Australian Examiner's Report No. 2 dated May 7, 2008, issued in co-pending related Australian application No. 2006201331, Huawei Technologies Co. Ltd.

Aoun, C. et al., "A NAT package for MGCP NAT Traversal; draft-aoun-mgcp-nat-package-02.txt", Internet Draft, Internet Engineering Task Force, Feb. 2003, pp. 1-9.

"Gateway control protocol: Media gateway overload control package", Series H: Audiovisual and Multimedia Systems—Infrastructure of audiovisual services—Communication procedures; ITU-T Recommendation H.24B.11, Nov. 2002, 16 pgs.

"Gateway control protocol: Media gateway resource congestion handling package", Series H: Audiovisual and Multimedia Systems—Infrastructure of audiovisual services—Communication procedures; ITU-T Recommendation H.248.10, Jul. 2001, 10 pgs.

Office Action of Jun. 24, 2008 in corresponding Japanese Application 2006-111142.

F. Andreasen, et al., "Media Gateway Control Protocol (MGCP) Version 1.0", RFC3435, Jan. 2003.

C. Aoun, et al., "A NAT package for MGCP NAT traversal", Internet Draft, Jun. 2006.

* cited by examiner

METHOD FOR MONITORING AND REPORTING EVENTS BY MEDIA GATEWAYS

CROSS-REFERENCE TO RELATED APPLICATIONS

This application is continuation of U.S. patent application Ser. No. 11/404,558, filed Apr. 14, 2006 now U.S. Pat. No. 8,134,926, which claims priority and benefit to Chinese Patent Application No. 200510064589.2, filed on Apr. 15, 2005. The afore-mentioned patent applications are hereby incorporated by reference in their entireties.

FIELD OF THE INVENTION

The present invention relates to network communication technology, and more particularly to a method for monitoring and reporting events by media gateways.

BACKGROUND OF THE INVENTION

As shown in FIG. 1, an MGC (Media Gateway Controller) and an MG (Media Gateway) are key components in an NGN (Next Generation Network). The MGC provides call control function, while the MG provides service bearing function, thereby implementing separation between call control plane and service bearing plane, and thus sharing network resources efficiently, simplifying upgrade of equipments and service expansion, and greatly reducing costs for development and maintenance.

Media Gateway Control Protocol is the main protocol between MGs and MGCs; presently, two protocols are widely used, i.e., H.248/MeGaCo and MGCP. In H.248 protocol, for example, the resources in MGs are abstracted as terminations. The terminations are categorized into physical terminations and ephemeral terminations; the former represents some semi-permanent physical entities, such as TDM channels; the latter represents some public resources that are obtained on request temporarily and then released after use, such as RTP streams. Any combination among terminations is abstracted as context. A context may include several terminations and thereby the relationship among terminations can be described in topology.

Based on above abstract model, call switching may be regarded as an operation on terminations and contexts. Such operations are accomplished by means of command requests and responses between MGCs and MGs. Such commands carry parameters also referred as descriptors. The descriptors are categorized into property, signal, event, and statistic. Parameters with service correlation are aggregated into a package logically.

Signals are used by an MGC to instruct an MG to perform operations of corresponding resources, e.g., send dial tone, ring-back tone, or busy tone to a subscriber. Events are used by an MGC to instruct an MG to monitor corresponding statuses, e.g., monitor whether a subscriber hangs off, hangs up, flashes the hook, and dials a number, etc. Events are usually triggered in case of status change and may result in corresponding responses, e.g., the dial tone is sent to the subscriber only when the subscriber hangs off.

However, in the present definition in H.248 protocol, events have to be issued by an MGC to an MG before the MG can start to monitor the corresponding status change. The mechanism is suitable for most of cases when viewed from a viewpoint that the MGC is a controller while the MG is a controlled entity. However, in some special cases, the mechanism has some disadvantages. For instance, after the MG is registered successfully to the MGC, monitoring of the MGC's status of activation must be started up immediately, which can be implemented by reporting an Inactivity Timeout event by the MG to trigger the MGC to feed back a response. However, in the existing definition in the protocol, if the MGC does not issue the event to the MG due to some causes (e.g., MGC is not configured, sudden fault, or transmission failure), the MG will not monitor the MGC's status of activation. As a consequence, the MG may operate abnormally since it has lost the control of MGC. Therefore, a part of the network system may be breakdown in some cases, degrading the stability of the network system.

SUMMARY OF THE INVENTION

In view of above disadvantages in the prior art, an object of some embodiments is to provide a method for monitoring and reporting events by media gateways, so as to solve the problem of system in some special cases if MG doesn't obtain events issued from a media gateway controller, and thereby improving the stability of the network system.

A method for monitoring and reporting events by media gateways, including:

A. presetting events to be monitored in the media gateways;

B. the media gateways monitoring the preset events and reporting the monitoring result to a media gateway controller during operation.

The event presetting in the media gateways shall meet the protocol between the media gateway controller and the media gateways.

The protocol for presetting events between the media gateway controller and the media gateways includes complying with the same parameters and Request IDs.

The events include events that can be monitored by the media gateways.

The step B further includes the step of: during the monitoring of the preset events by the media gateways, when the media gateway controller issues events, relevant parameters and Request IDs which have been preset in the media gateways to the media gateways, performing monitoring on the events with relevant parameters and Request IDs issued from the media gateway controller.

The step B further includes the step of: if the events issued from the media gateway controller and have been preset in the media gateways have a life cycle, performing monitoring on the events with relevant parameters and Request IDs issued from the media gateway controller within the life cycle.

The step B further includes the step of: if the events issued from the media gateway controller and have been preset in the media gateways have a life cycle, performing monitoring on the events with relevant parameters and Request IDs preset in the media gateways beyond the life cycle.

The step B further includes the step of: if the events issued from the media gateway controller and have been preset in the media gateways have no life cycle, performing monitoring continuously on the events with relevant parameters and Request IDs issued from the media gateway controller.

The events may be preset automatically or manually.

The problem of system resulted from the fact that the events can not be issued from the MGC to the MGs due to various reasons can be avoided by presetting events in the MGs and monitoring the status of the events automatically, and reporting the monitoring results to the MGC after the MGs are started up; thereby, system stability can be improved.

DETAILED DESCRIPTION OF THE EMBODIMENT

To make those skilled in the art understand and implement the present invention, hereunder some embodiments of the present invention are described in detail with reference to the attached drawings.

In one embodiment of the present invention, events can be issued by the MGC to the MGs or preset in the MGs, so that the MGs can monitor corresponding statuses, e.g., whether the subscriber hangs off, hangs up, flashes the hook, dial a number, whether there is any network fault or quality alarm, and whether the timer times out, etc. Events issued from the MGC to the MGs are attached with Request IDs and possibly required parameters. Those issued events are also referred as requested events. Once any MG detects any change in those events, it will report the corresponding event(s) to the MGC, with the above attached same Request ID and possibly required parameters. The reported event is also referred as an observed event. The observed event correlates with requested event by the same Request ID, while the parameters attached to them may be different.

The embodiment of the present invention provides a method for automatically monitoring and reporting events by MGs, in which events to be monitored are preset in the MGs, and when the MGs are started up, the MGs monitor the preset events automatically and reports the monitoring result to the MGC.

Figure 1:
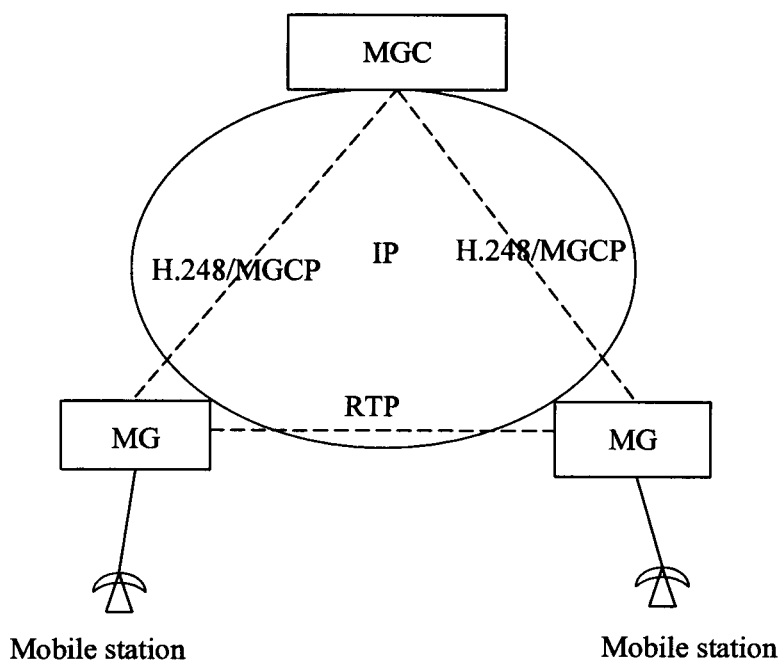
FIG. 1 is a schematic networking diagram of an MGC and MGs in a next generation network.
Figure 2:
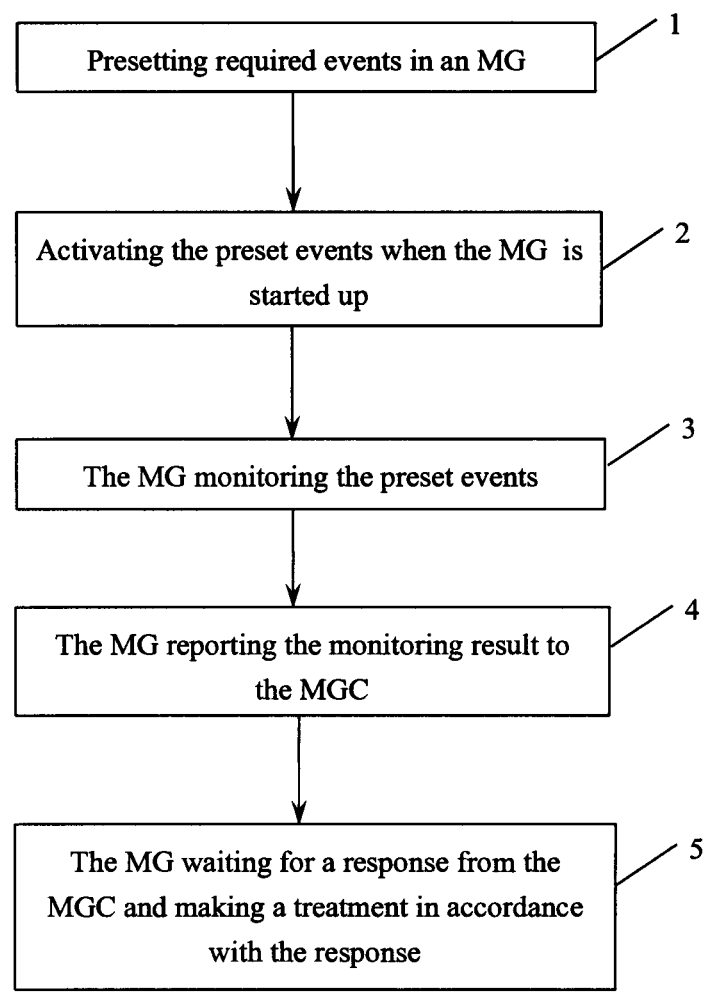
FIG. 2 is a flow diagram according to an embodiment of a method of the present invention.

As shown in FIG. 2, in step 1, a subscriber can presets in an MG any event that can be monitored by the MG as needed, e.g., off-hook, on-hook, dialing, flashing the hook, network fault, quality alarm, timer timeout, etc. In step 2, when the MG is started up, the MG activates these preset events. In step 3, the MG monitors the preset events. In step 4, the MG reports the monitoring result to the MGC. In step 5, the MG waits for a response from the MGC and performs a treatment in accordance with the response from the MGC. The presetting of events in the MG shall meet the protocol between MGC and MGs, such as using the same parameters and Request IDs. In this way, the MGC will not make a wrong response when receiving any report of an event preset in the MG.

As an example, the embodiment of the present invention is described in detail with an Inactivity Timeout event (a timer timeout event, used by the MG to monitor the status of the MGC).

First, the role of the timer is explained. When the timer is activated in the MG, any message from the MGC to the MG will cause the MG to reset the timer, so that the timer will not time out; if no message is received from the MGC within a long time and ultimately results in timing out of the timer, the MG will report the event to the MGC. If the MGC responds to the report, it is indicated that the MGC is still normal and the MG will continue the status detection of MGC through above process; otherwise the MGC is abnormal, and the MG has to activate an exception handling mechanism, for example, registering to a backup MGC renewadly.

According to the embodiment of the present invention, an Inactivity Timeout event and its parameter, Maximum Inactivity Time (e.g., 30s), and Request ID (e.g., 0) are preset in the MG; after the MG is started up and registers to the MGC successfully, the MG activates the Inactivity Timeout event, i.e., the MG begins to monitor messages from the MGC, with the value of the parameter Maximum Inactivity Time as the timing duration of the timer. In this way, if the MGC fails, the MG can't receive any message from the MGC to reset the timer; once the timer times out, the MG will report the Inactivity Timeout event to the MGC with the preset Request ID. If the MGC doesn't respond to the event reported from the MG, the MG will activate the exception handling mechanism, for example, registering to the backup MGC renewedly. In this way, the potential problem that the MG can't activate monitoring for the event since the MGC doesn't issue the event to the MG, which may result in system breakdown due to the MGC fault, can be eliminated.

The presetting of events in the MG can be performed automatically or manually, e.g., by inline code in software, by control console, or by network management, etc.

During the monitoring of the preset events by the MG, if the MGC issues to the MG an event that has been preset in the MG, the MG will monitor the event with relevant parameters and Request ID issued from the MGC. If the event has a life cycle, the MG monitors the event with relevant parameters and Request ID issued from the MGC within the life cycle; and the MG monitors the event with relevant parameters and Request ID preset therein beyond the life cycle. If the event has no lift cycle, the MG will monitors continuously the event with relevant parameters and Request ID issued from the MGC.

According to the embodiment of the present invention, the system breakdown problem resulted from the fact that the events cannot be issued from the MGC to the MG due to various reasons can be avoided by presetting events in the MG and monitoring the events automatically after the MG is started up and reporting the monitoring result to the MGC; thereby, the system stability can be improved.

Though the present invention is described with reference to the above embodiment, those skilled in the art should understand that various modifications and variations can be made to the present invention, without departing from the spirit and nature of the present invention; therefore, the scope of the present invention shall be defined in the attached claims.

What is claimed is:

1. A method for reporting an event by a media gateway, the method comprising:
presetting, a preset event with a preset parameter and a preset Request Identifier (ID) on the media gateway according to an agreement between a media gateway controller and the media gateway;
monitoring, by the media gateway, the preset event;
reporting, by the media gateway, a monitoring result to the media gateway controller when the preset event is detected by the media gateway; and
issuing, by the media gateway controller, the preset event with an issued parameter and an issued Request ID to the media gateway during the monitoring period of the preset event.

2. The method according to claim 1, wherein the preset event is preset before the media gateway is started up.

3. The method according to claim 1, wherein the preset event is an event that can be monitored by the media gateway.

4. The method according to claim 1, wherein the preset event issued from the media gateway controller has a life cycle, and wherein the media gateway monitors the preset event according to the issued parameter and the issued Request ID within the life cycle.

5. The method according to claim 1, wherein the preset event issued from the media gateway controller has a life cycle, and wherein the media gateway monitors the preset event according to the preset parameter and the preset Request ID beyond said life cycle.

6. The method according to claim 1, wherein the preset event issued from the media gateway controller has no life cycle, and wherein the media gateway continuously monitors the preset event according to the issued parameter and the issued Request ID.

7. The method according to claim 1, wherein the preset event is preset automatically or manually.

8. The method according to claim 1, wherein the preset event is used for the media gateway to monitor a corresponding status.

9. A media gateway, comprising:
a monitoring unit configured to monitor a preset event;
a reporting unit configured to report a monitoring result to a media gateway controller when the monitoring unit has detected the preset event; and
a receiving unit configured to receive the preset event with an issued parameter and an issued Request Identifier (ID) issued by the media gateway controller during a monitoring period of the preset event, and
wherein the preset event with a preset parameter and a preset Request ID is preset on the media gateway according to an agreement between the media gateway controller and the media gateway.

10. The media gateway according to claim 9, wherein the preset event is preset before the media gateway is started up.

11. The media gateway according to claim 9, wherein the preset event issued from the media gateway controller has a life cycle, and wherein the monitoring unit monitors the preset event according to the issued parameter and the issued Request ID within the life cycle.

12. The media gateway according to claim 9, wherein the preset event issued from the media gateway controller has a life cycle, and wherein the monitoring unit monitors the preset event according to the preset parameter and the preset Request ID beyond said life cycle.

13. The media gateway according to claim 9, wherein the preset event issued from the media gateway controller has no life cycle, and wherein the monitoring unit continuously monitors the preset event according to the issued parameter and the issued Request ID.

14. A communication system, comprising:
a media gateway; and
a media gateway controller,
wherein a preset event with a preset parameter and a preset Request Identifier (ID) is preset on the media gateway according to an agreement between the media gateway controller and the media gateway,
wherein the media gateway is configured to monitor the preset event and report a monitoring result to the media gateway controller when the preset event is detected by the media gateway, and
wherein the media gateway controller is configured to issue the preset event with an issued parameter and an issued Request ID during the monitoring period of the preset event.

15. The communication system according to claim 14, wherein the preset event issued from the media gateway controller has a life cycle, and wherein the monitoring unit monitors the preset event according to the issued parameter and the issued Request ID within the life cycle.

16. The communication system according to claim 14, wherein the preset event issued from the media gateway controller has a life cycle, and wherein the monitoring unit monitors the preset event according to the preset parameter and the preset Request ID beyond said life cycle.

17. The communication system according to claim 14, wherein the preset event issued from the media gateway controller has no life cycle, and wherein the monitoring unit continuously monitors the preset event according to the issued parameter and the issued Request ID.

* * * * *

UNITED STATES PATENT AND TRADEMARK OFFICE
CERTIFICATE OF CORRECTION

PATENT NO. : 8,614,953 B2
APPLICATION NO. : 13/278362
DATED : December 24, 2013
INVENTOR(S) : Yangbo Lin It is certified that error appears in the above-identified patent and that said Letters Patent is hereby corrected as shown below:

Title Page 1, Item (56) References Cited, under Other Publications, the following cited art should read:

Aoun, C., et al.; Nortel Networks; "A NAT package for MGCP NAT traversal, draft-aoun-mgcp-nat-package-oo.txt"; Internet Draft; Category: Informational; Jun. 2002 (7 pgs.).

Title Page 1, Item (57) Abstract should read:

A method for monitoring and reporting events by media gateways, including: presetting events in the media gateways; and the media gateways monitoring the preset events and reporting the monitoring result to a media gateway controller during operation. The events may include: off-hook, on-hook, dialing, hook flash, network fault, quality alarm, and timer timeout, etc. By presetting events in the media gateways, the problem of the system resulted from the fact that the media gateways can not obtain events issued from the media gateway controller due to various reasons which can be avoided through presetting events in the media gateway and then monitoring and reporting the events by the media gateway automatically after the media gateways are started up. Thereby, system stability can be improved.

Title Page 2, Item (56) References Cited, under Other Publications, the following cited art should read:

Zhengguang, W., et al.; "Comparison between the Existing two Media Gateway Control Protocols for Next Generation Network"; National Laboratory of Switching Technology and Telecommunications, Beijing, 2004 (pp. 20-23).

Canadian Office Action dated (mailed) Oct. 18, 2011, issued in related Chinese Application No. 2 542 088, Huawei Technologies Co., Ltd. (5 pgs.).

International Telecommunication Union; ITU-T; H.248.1; Telecommunication Standardization Sector of ITU; Series H: Audiovisual and Multimedia Systems, "Gateway Control Protocol, Version 2", May Signed and Sealed this
Eighteenth Day of March, 2014

Michelle K. Lee
*Deputy Director of the United States Patent and Trademark Office*

2002, 148 pgs.

International Telecommunication Union; ITU-T; H.248.1 v.2; Telecommunication Standardization Sector of ITU; Series H: Audiovisual and Multimedia Systems, "Gateway Control Protocol, Version 2; Corrigendum 1", Mar. 2004, 41 pgs.

Aoun, C., et al., "A NAT package for MGCP NAT traversal", Internet Draft, Jun. 2006.